(12) United States Patent
Willis

(10) Patent No.: US 7,146,683 B1
(45) Date of Patent: Dec. 12, 2006

(54) ARTICULATED CASTER

(75) Inventor: Douglas G. Willis, Colby, KS (US)

(73) Assignee: Martin Mobile Company, LLC, Colby, KS (US)

( * ) Notice: Subject to any disclaimer, the term of this patent is extended or adjusted under 35 U.S.C. 154(b) by 0 days.

(21) Appl. No.: 10/886,369

(22) Filed: Jul. 6, 2004

(51) Int. Cl.
*B60B 33/00* (2006.01)
*A47B 91/00* (2006.01)

(52) U.S. Cl. .............................. 16/19; 16/47; 16/31 R; 16/18 R

(58) Field of Classification Search ................ 16/18 R, 16/45, 47, 19, 28, 30, 35 R; 301/1, 5.1; 280/47.34, 280/79.11, 79.4
See application file for complete search history.

(56) References Cited

U.S. PATENT DOCUMENTS

| | | | |
|---|---|---|---|
| 301,925 A | 7/1884 | Roux | |
| 344,988 A | 7/1886 | Richmond | |
| 1,622,447 A | 3/1927 | Kalberer | |
| 1,666,139 A | 4/1928 | Johnson | |
| 2,123,707 A | 7/1938 | Bloch | |
| 3,433,500 A | 3/1969 | Christensen | |
| 4,053,129 A | 10/1977 | Graff | |
| 4,494,272 A * | 1/1985 | Morita | ........................ 16/35 R |
| 5,088,799 A * | 2/1992 | Redmon et al. | ........ 301/111.05 |
| 5,348,326 A * | 9/1994 | Fullenkamp et al. | .... 280/43.17 |
| 5,507,069 A * | 4/1996 | Willis | ........................ 16/18 R |
| 6,212,863 B1 * | 4/2001 | Thomas | ...................... 56/17.2 |
| 6,550,101 B1 | 4/2003 | Plate | ............................. 16/48 |
| 6,726,524 B1 * | 4/2004 | Yamaguchi et al. | ......... 446/431 |
| 6,880,202 B1 * | 4/2005 | Thompson et al. | ......... 16/35 R |

FOREIGN PATENT DOCUMENTS

GB   4822   0/1877

* cited by examiner

*Primary Examiner*—Katherine Mitchell
*Assistant Examiner*—Andre' L. Jackson
(74) *Attorney, Agent, or Firm*—Hovey Williams LLP

(57) ABSTRACT

An apparatus for supporting an object includes a base assembly and at least three wheels pivotally attached to the base assembly. A pivot arm includes a flange plate at an upper end for attachment to the object. An opposite lower end of the pivot arm includes a universal joint for pivotal motion about two perpendicular axes that is attached to the base assembly. A brake assembly is attached to the pivot arm. The brake assembly includes a first disengaged position and a second engaged position that is latched. When the brake assembly is in the second position, a brake pad is forced downward below a level of a surface and into frictional engagement with the surface. More than one apparatus can also be attached to an adapter plate to provide greater floatation. Pivotal attachment to a support beam is also described.

18 Claims, 11 Drawing Sheets

ARTICULATED CASTER

BACKGROUND OF THE INVENTION

1. Field of the Invention

The present invention, in general relates to casters and, more particularly, to casters that are adapted for use on irregular surfaces.

Prior U.S. Pat. No. 5,507,069 that issued on Apr. 16, 1996, to the same inventor describes a related type of articulated caster and its disclosure and contents are included herein by reference.

There is a need for casters to support and move objects over varying types of terrain. Even concrete floors have small irregularities in the surface that casters must pass over. These irregularities are substantial for the wheels of a caster to overcome when there is a heavy load on the caster.

The prior patent, mentioned hereinabove, discloses a unique mechanism by which a caster's trailing wheels can, at times, lag behind each other and in so doing rise up over obstacles.

While this represents a substantial improvement in casters, there still remain certain unsatisfied needs. For example, there is a need for a simple and effective braking mechanism for use with a caster.

Previous braking methods that apply friction to a wheel of a caster are ineffective if there is a low coefficient of friction intermediate the wheel and the surface upon which the wheel is placed. This is because such a strategy for braking relies upon friction between a wheel and the surface to prevent movement of the object being supported.

Also, there is no way to vary the coefficient of friction at the interface between the wheel and the surface. By definition, the wheels of a caster must be durable. This generally translates into hard wheels, especially when heavy loads are carried. Hard wheels (steel, certain types of plastics, etc.) that can carry heavy loads tend to have a relatively low coefficient of friction. This is the opposite of what is desired.

Often, the object being supported must be retained not only in place, but it must be prevented from moving at all with respect to the surface. Attempting to supply a brake force directly to a caster's wheel to prevent rotation of the wheel introduces play, even when the wheel is a non-pivoting fixed-direction type of caster.

When the caster is adapted to pivot (for steering purposes), there is substantial movement that can occur even with a "locked" wheel allowing the wheel to stay in position on the ground and pivot about a circle. This results in considerable movement of the payload.

Also, there is a long standing need to positively engage the braking effect of a caster when desired and to positively remove the braking effect when it is not desired. The braking mechanisms of certain prior types of caster design do not totally engage or disengage. Consequently, a user may think a brake is fully applied when, in fact, it has only been partially applied. Conversely, a user may think a brake is fully disengaged when, in fact, it is only partially disengaged. This problem is also further aggravated by the fact that most users are unable to determine which direction a braking lever adjacent to a wheel of a caster is urged for braking. Consequently, the user may think he has removed the braking from all four casters (on at each of four corners is typical for most objects) when, in fact, the braking mechanism remains engages for one or more of the casters. This makes movement of the object difficult to accomplish. Conversely, when the user thinks he has applied the braking force to all four casters and when some of them are not engaged, the object (i.e., the load or cargo) may begin to move and "run away" from the user once it is released.

Also, all brakes wear. With certain prior types of casters, this means the braking force decreases with age as the braking mechanism wears.

Furthermore, stopping a wheel of the caster from rotating is a poor solution at braking the load. The caster's wheels are typically hard and have a low coefficient of friction intermediate the wheel and the surface upon which the wheel is to be used. A high coefficient of friction wheel tends to be a soft wheel that wears quickly and is, therefore, either not used or available with casters that are intended to support heavy loads.

Furthermore, when the wheel is used to brake a caster, there is no way to vary the coefficient of friction intermediate the caster and the surface upon which the caster is used.

Also floors, as mentioned hereinabove, are irregular. If an attempt is made to apply a braking force from the caster directly to a surface underneath the caster, it is desirable to accommodate fluctuations in the distance the floor is disposed below the caster.

Also, it is desirable to be able to safely apply a caster brake while in motion without risk of injury, for example, the caster running over the foot of the user.

Prior art designs also shift the center of gravity of an applied load when the caster changes direction.

Accordingly, there is a need for a braking caster that overcomes these prior limitations.

Also, while the benefits of the caster that is disclosed in the prior mentioned patent application are substantial, there are disadvantages associated with its design. For example, the ball and socket assembly that it utilizes is difficult to manufacture and, therefore, expensive. It is time-consuming to assemble.

There is also a potential weakness at the point of connection immediately above the pivot ball that tends to limit the maximum amount of force (i.e., load) that can be accomplished.

Also, the ball and socket assembly requires structures that can support both the ball and the socket which tend to limit the range of caster applications that can utilize such a design.

It is desirable to provide a stronger joint that has the additional benefits of being less expensive to manufacture and easier to assembly as well as adapted for use, including retrofit, into a variety of existing caster applications.

It is also desirable to provide an articulated caster that can be used in plurality to form a compound carriage system that is adapted to support a payload without a need to excessively elevate the payload.

Accordingly, there exists today a need for an articulated caster that can help ameliorate the aforementioned difficulties.

Clearly, such an apparatus would be a useful and desirable device.

2. Description of Prior Art

Casters are, in general, known. For example, the following patents describe various types of these devices:

U.S. Pat. No. 5,507,069 to Willis, Apr. $16^{th}$ 1996;
U.S. Pat. No. 301,925 to Roux, Jul. $15^{th}$, 1884;
U.S. Pat. No. 344,988 to Richmond, Jul. $6^{th}$, 1886;
U.S. Pat. No. 1,622,447 to Kalberer, Mar. $29^{th}$, 1927;
U.S. Pat. No. 1,666,139 to Johnson, Apr. $17^{th}$, 1928;
U.S. Pat. No. 2,123,707 to Bloch, Jul. $12^{th}$, 1938;
U.S. Pat. No. 3,433,500 to Christensen, Mar. $18^{th}$, 1969;
U.S. Pat. No. 4,053,129 to Graff, Oct. $11^{th}$, 1977; and
U.K. Patent No. 4822 to Kendrick's, Dec. $18^{th}$, 1877.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide an articulated caster that includes a braking mechanism.

It is also an important object of the invention to provide an articulated caster that includes a braking mechanism that does not apply friction to a wheel of the caster.

Another object of the invention is to provide an articulated caster that includes a braking mechanism that supplies a braking force directly from the caster to a surface upon which the caster is used.

Still another object of the invention is to provide an articulated caster that includes a braking mechanism that supplies a braking force directly from the caster to a surface upon which the caster is used and which provides a coefficient of friction that is adapted for the surface.

Still yet another object of the invention is to provide an articulated caster that includes a braking mechanism that supplies a braking force directly from the caster to a surface upon which the caster is used and which provides a pad having a desired coefficient of friction that is adapted for the surface.

Yet another important object of the invention is to provide an articulated caster that includes a braking mechanism that supplies a braking force directly from the caster to a surface upon which the caster is used and which provides selection of a pad having a desired coefficient of friction that is adapted for the surface.

Still yet another important object of the invention is to provide an articulated caster that includes a braking mechanism which prevents movement of a load being supported by the caster with respect to a surface upon which the caster is used.

A first continuing object of the invention is to provide an articulated caster that includes a braking mechanism which supplies a braking force directly from the caster to a surface upon which the caster is used that is adapted for use with a plurality of casters that are used to support a load that is being supported by the casters.

A second continuing object of the invention is to provide an articulated caster that includes a braking mechanism that can be locked in an off position that does not increase friction of any wheel of the caster nor does it increase friction between the caster and surface upon which the caster is used.

A third continuing object of the invention is to provide an articulated caster that includes a braking mechanism that can be locked in an on position.

A fourth continuing object of the invention is to provide an articulated caster that includes means for compensating for the wear of a pad intermediate the caster and a surface upon which the caster is used.

A fifth continuing object of the invention is to provide an articulated caster that includes a braking mechanism which compensates for irregularities in the surface upon which the caster is used.

A sixth continuing object of the invention is to provide an articulated caster that provides for articulation about two simultaneous axes.

A seventh continuing object of the invention is to provide an articulated caster that provides for articulation about two axes and which is inexpensive to manufacture.

An eighth continuing object of the invention is to provide an articulated caster that includes a universal joint for articulation about two simultaneous axes.

A ninth continuing object of the invention is to provide an articulated caster that provides for articulation about two axes and which is adapted to carry a heavy load.

A tenth continuing object of the invention is to provide an articulated caster that provides for articulation about two axes and which is adapted for use with a wide variety of objects.

An eleventh continuing object of the invention is to provide an articulated caster that provides for increased load carrying capacity without an increase in the height above grade that the object being supported by the caster must be disposed.

A twelfth continuing object of the invention is to provide an articulated caster that lessens a change in a center of gravity of an applied load when the caster changes direction.

A thirteenth continuing object of the invention is to provide an articulated caster that includes a brake actuation mechanism that remains in a fixed position during movement of the caster.

A fourteenth continuing object of the invention is to provide an articulated caster that includes a brake actuation mechanism that decreases the chance that injury might occur to a user, for example, having the caster run over a foot, when the user attempts to apply the brake actuation mechanism during movement of the caster.

A fifteenth continuing object of the invention is to provide an articulated caster that is adaptable to include a conventional type of a universal joint.

A sixteenth continuing object of the invention is to provide an articulated caster that includes three wheels that always define a plane.

A seventeenth continuing object of the invention is to provide a plurality of articulated casters that are connected together that includes three wheels that always define a plane.

Briefly, an articulated caster that is constructed in accordance with the principles of the present invention has a base assembly comprised of three or more wheels that extend radially away from a center of the base assembly. A pivot arm is attached at an upper end thereof to a flange plate. The flange pate is attached (i.e., bolted) to an object to be supported by the caster. A lower end of the pivot arm is attached to the base assembly by a pair of bolts that are part of a universal joint. The universal joint allows for articulation of the pivot arm about two axes simultaneously. A brake mechanism is attached to the pivot arm and is adapted to urge a brake pad from a first retracted position in which the brake pad is elevated above a plane of a floor and no braking force is supplied to a second extended position in which the brake pad is extended below the plane of the floor where the brake pad is in frictional cooperation with the floor and a substantial braking force is applied. The use of a plurality of articulated casters that are attached to an adapter plate is also described for use in supporting a heavier payload as well as attachment to support beams.

DETAILED DESCRIPTION OF THE INVENTION

Figure 1:
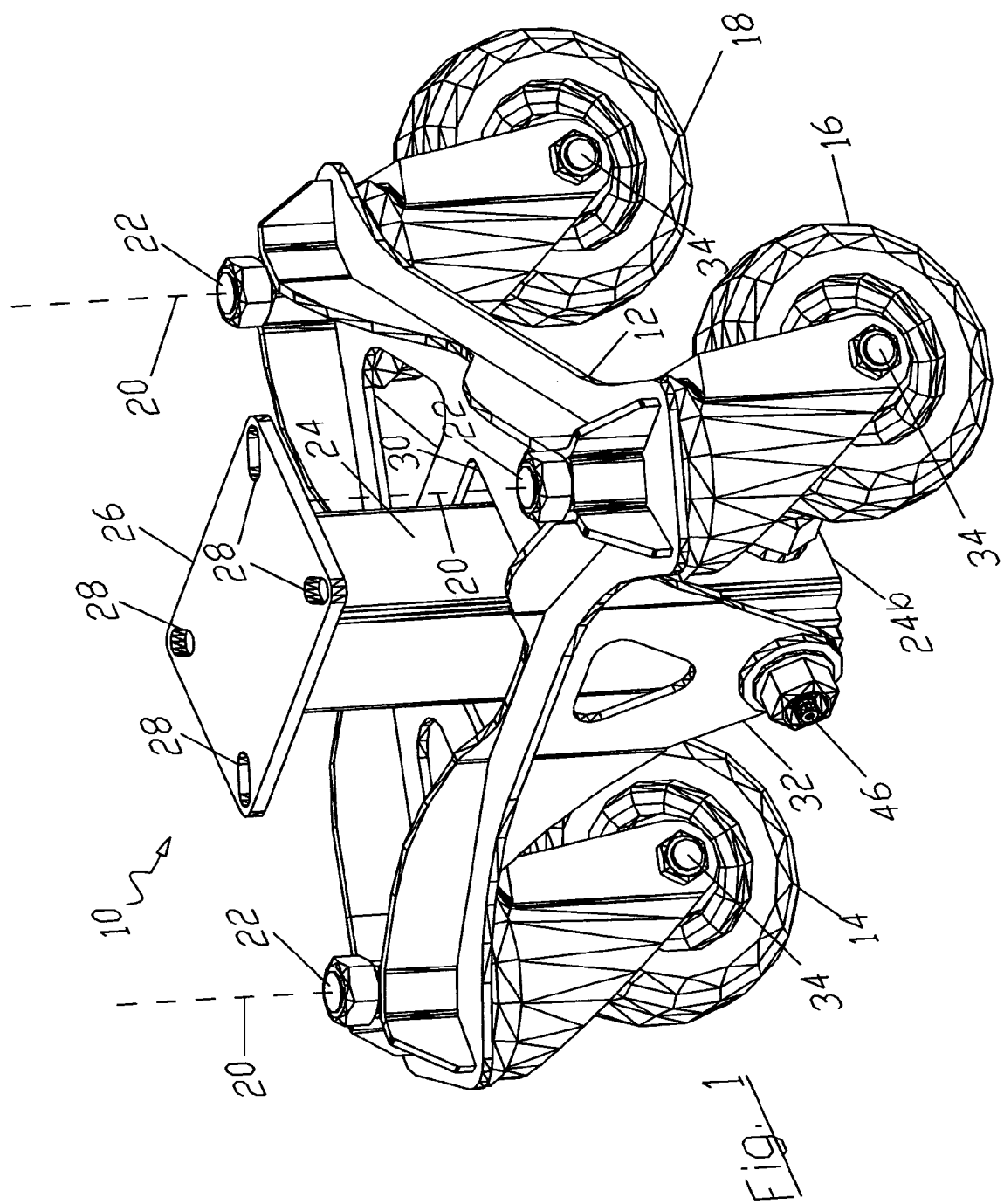
FIG. 1 is a view in perspective of the top of an articulated caster.
Figure 2:
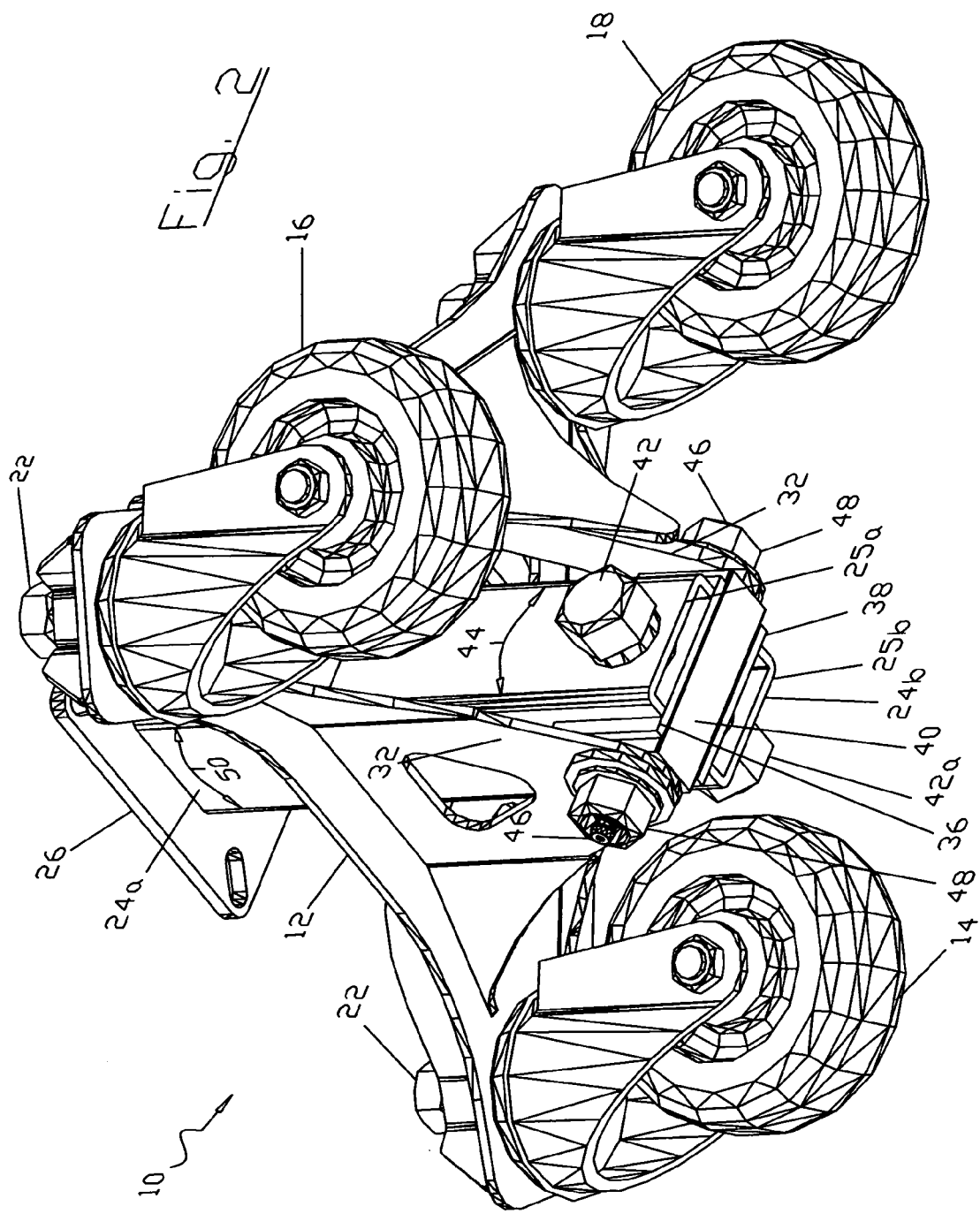
FIG. 2 is a view in perspective of the bottom of the articulated caster of FIG. 1.

Referring on occasion to all of the drawing figures and in particular now to FIG. 1 and FIG. 2 is shown, an articulated caster, identified in general by the reference numeral 10.

A base assembly 12 preferably includes a lead wheel 14 and two trailing wheels 16, 18. All wheels 14–18 preferably rotate about a vertical axis 20 that passes through a mounting bolt 22 of each wheel 14–20.

The two trailing wheels 16, 18 are preferably also staggered so that they are not parallel. This helps smooth movement when a surface irregularity is encountered.

A pivot arm 24 includes an upper end 24a and an opposite lower end 24b. The upper end 24a is attached to a flange plate 26. The flange plate includes bolt holes 28 and is used to attach the caster 10 to an object (not shown) that is to be supported by the caster 10.

The pivot arm 24 passes through a correspondingly shaped opening 30 in the base assembly 12. The base assembly 12 includes a pair of side members 32 that extend down on opposite sides of the opening 30 to a location that is, preferably, lower than that of an axle 34 of each of the wheels 14–18. The side members 32 are securely attached to the base assembly 12.

All load (i.e., the weight of the object) that is applied to each caster 10 is transferred through the pivot arm 24 to a lower end of both of the side members 32. This is described in greater detail hereinafter.

However, it is important to note that by transferring the load to a location within the caster 10 that is proximate or below the axles 34, as the object is moved laterally (along the surface), there is no force applied to the caster 10 above the axles 34. This provides a low effective center of gravity for the caster 10 as it supports the weight of the object, thereby making the caster 10 especially stable.

Referring now primarily to FIG. 2, the lower end 24b of the pivot arm 24 includes a first side 25a and an opposite second side 25b. A rectangular opening is provided in the lower end 24b, of the pivot arm 24 intermediate the first side 25a and the second side 25b. The rectangular opening is open at the lower end 24b, and it extends up along the longitudinal length of the pivot arm 24 for a predetermined distance.

A first side plate 36 is attached to the first side 25a, and a second side plate 38 is attached to the second side 25b. Attachment, as used anywhere herein, is by any preferred method. It can include welding, molding together as a unit, bolts and nuts, or any other method.

A pivot block 40 is inserted in the space between the first and second side plates 36, 38. The pivot block 40 can move in the space, as is described hereinbelow, yet the fit between the pivot block 40 and the side plates 36, 38 includes minimal tolerance and, therefore, minimal slack. As perhaps best shown in FIG. 2, this arrangement provides for slidable interengagement between the pivot block 40 and side plates 36, 38. More particularly, the opposite surfaces of the illustrated pivot block 40 slidably engage respective ones of the side plates 36,38 so that relative movement between the pivot arm 24 and pivot block 40 is restricted to rotation about a single axis (defined by a bolt in the preferred embodiment, as will be discussed).

A first bolt 42 passes through an opening in the first side 25a, through a coincident opening in the first side plate 36, through a coincident opening through the pivot block 40, through a coincident opening in the second side plate 38, and through a coincident opening in the second side 25b. The first bolt 42 is secured in place, preferably by a lock nut 42a or other locking means.

The pivot arm 24 is adapted to pivot from side to side, as shown by arrow 44, with respect to the pivot block 40. This defines a first axis of pivoting for the pivot arm 24 with respect to the base assembly 12 (i.e., through a longitudinal axis of the first bolt 42). Obviously, the pivot arm 24 cannot pivot more than the space intermediate the pivot arm 24 and the opening 30 in the base assembly 12 allows.

The pivot block 40 includes a pair of threaded extensions (not shown) that extend from the center of the pivot block 40 and which pass through two openings provided on opposite sides of the side members 32 as low as possible. A grease fitting 46 is preferably attached to each threaded extension wherein each threaded extension includes an opening that is adapted to convey grease into the pivot block 40. If preferred, only one grease fitting 46 may be used. Such lubricant enhances sliding engagement between the pivot block 40 and the side members 32. It is particularly noted that the ends of the pivot block 40 present surfaces, each of which each slidably engages a respective one of the opposed inside surfaces of the side members. Moreover, this sliding interengagement between the pivot block 40 and side members 32 serves to restrict relative movement therebetween to rotation about a single axis defined by the threaded extensions of the pivot block 40 in the preferred embodiment.

A pair of lock nuts 48 cooperate with threads on the threaded extensions and are used to secure the pivot block 40 to the side members 32. The pivot block 40, therefore, acts as a second bolt to secure the pivot arm 24 to the base assembly 12 and as one which includes a longitudinal axis that is always perpendicular with respect to the first bolt 42.

Another embodiment, also preferable, is to include the grease fitting 46 in a hollow bolt (in this alternate embodiment, also as shown, the hollow bolt is identified by reference number 48), which, accordingly, shows the head of the hollow bolt 48 and where the hollow bolt 48 screws into threads that are provided in an end of the pivot block 40.

The pivot block 40 is adapted to pivot from side to side, as shown by arrow 50, with respect to the side members 32, and within the limits as afforded by the opening 30. This defines a second axis of pivoting for the pivot arm 24 (i.e., around the longitudinal center of the pivot block 40) with respect to the base assembly 12.

Accordingly, the caster 10 is adapted to pivot about two axes that are perpendicular to each other with respect to the base assembly 12. It is possible to use angles other than perpendicular for special purposes. The longitudinal axis of the first bolt 42 is in line with the normal direction (i.e., line) of travel. The longitudinal axis of the pivot block 40 (the second bolt) is preferably disposed at a 90 degree angle with respect to the normal direction of anticipated movement by the caster 10. This allows the wheels 14–18 of the caster to overcome surface irregularities with ease.

Figure 3:
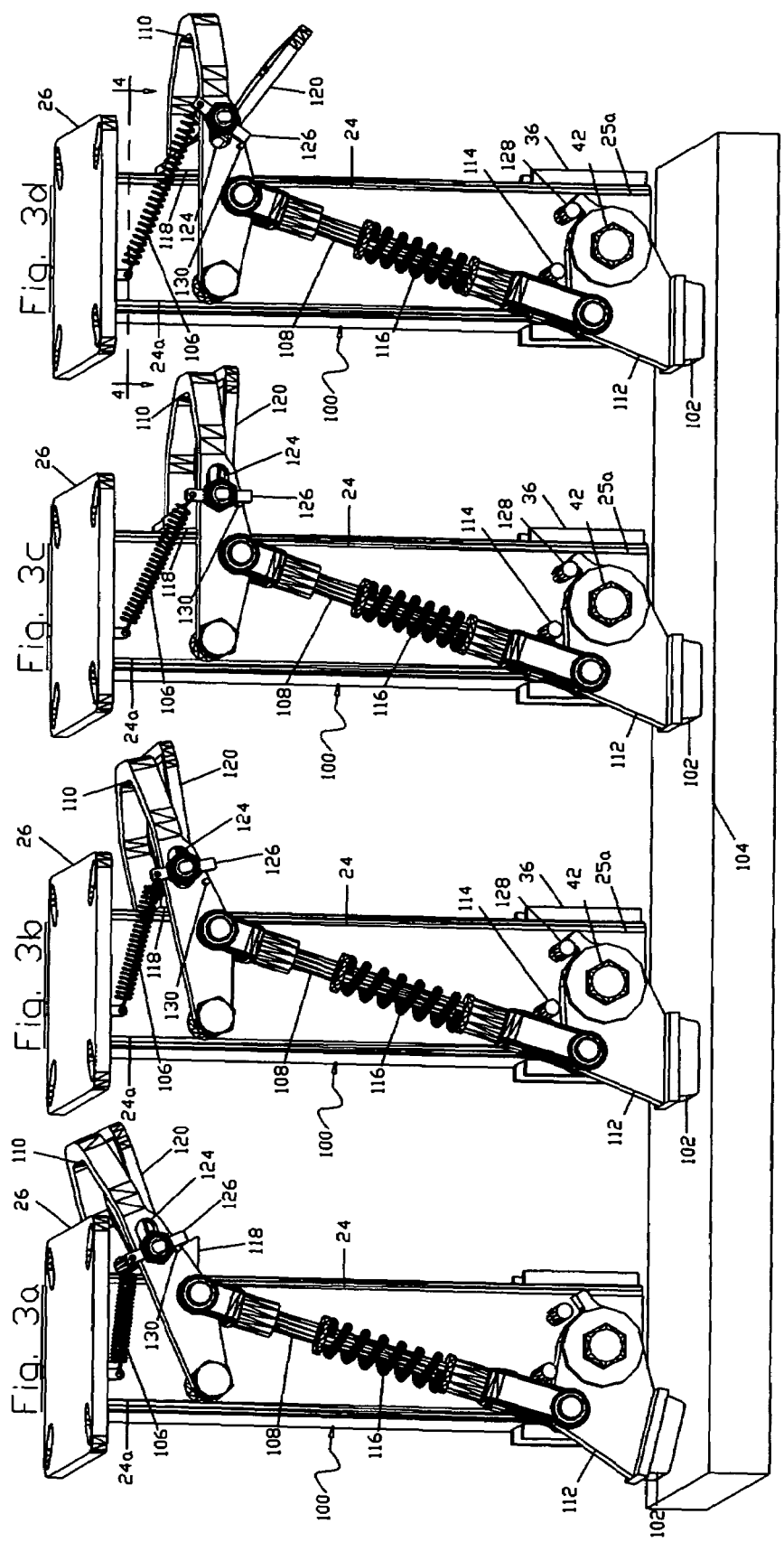
FIGS. 3a–3d include side views of a brake mechanism in an unlocked position, locked, locking, and released positions.
Figure 4:
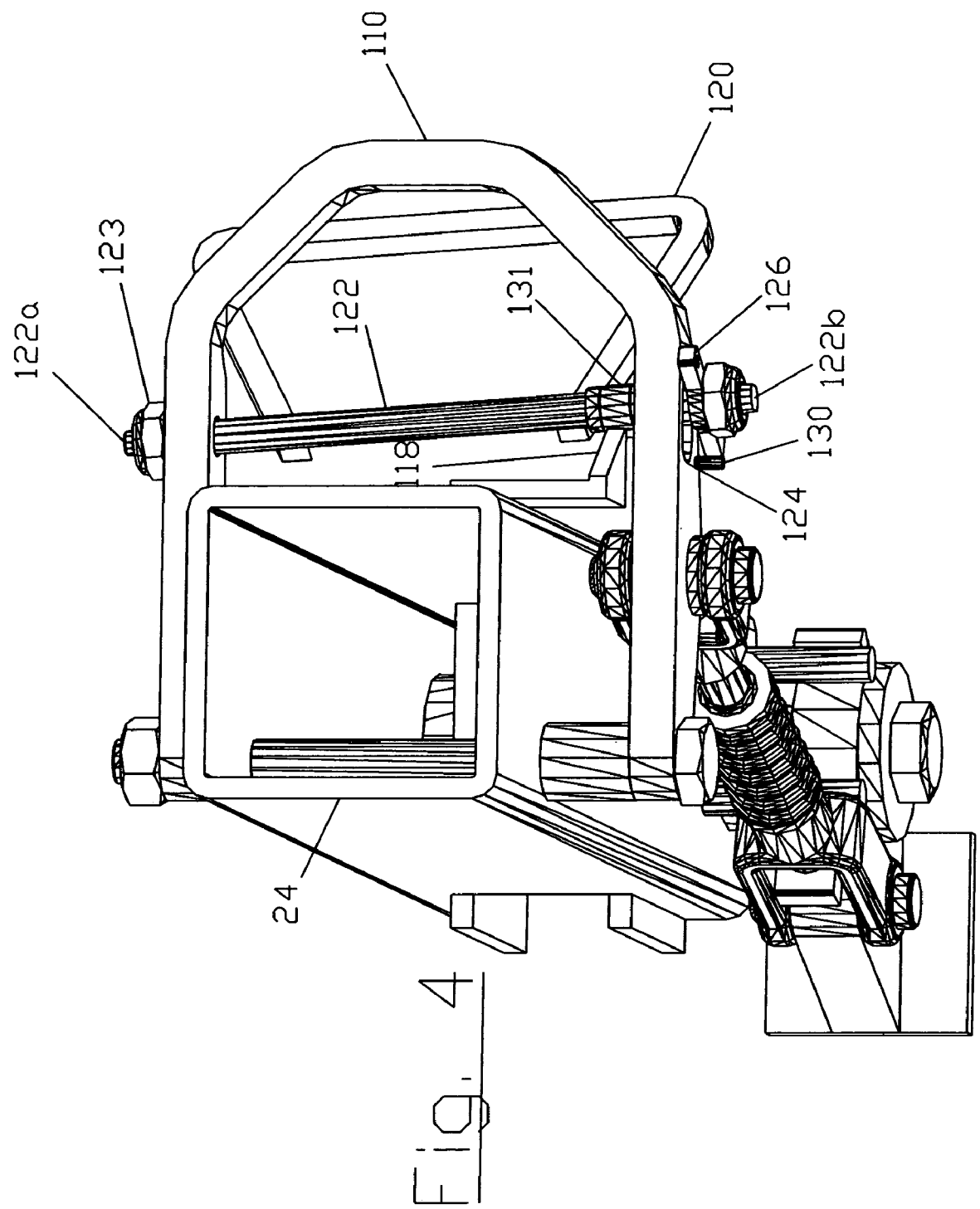
FIG. 4 is a top view of the brake mechanism of FIGS. 3a–3d taken along the line 4—4 in FIG. 3d.

Referring now in particular also to FIGS. 3a–3d and also on occasion to FIG. 4, is shown an optional brake assembly, identified in general by the reference numeral 100.

FIG. 3a shows the brake assembly 100 in a first retracted position in which a brake pad 102 is elevated above a surface 104.

A return spring 106 is holding the brake assembly 100 in the first retracted position. This ensures that no braking force is applied when the brake assembly 100 is released (i.e., when it is in the first position).

A pivot rod 108 is pivotally attached at an upper end to a brake lever 110 and at an opposite end to a brake pad support member 112. The brake pad support member 112 is attached over one end of the first bolt 42, about which it is adapted to pivot.

There are of course other ways of pivotally attaching the brake pad support member 112. For example, a sleeve (not shown) may be welded to the pivot arm 24 and another bolt may be used to engage threads in the sleeve allowing the brake pad support member 112 to pivot about the other bolt or sleeve as desired. Alternatively, a pivot pin may be used as well as bushings, etc. These variations are useful in diminishing wear or improving smoothness of operation.

A first stop pin 114, attached to the pivot arm 24, prevents the brake pad support member 112 from retracting further, as urged by the return spring 106.

The pivot rod 108 preferably bears against a compression spring 116. In the first position, the compression spring 116 is somewhat relaxed because the pivot rod 108 is not supplying a force that is attempting to compress it.

A latch plate 118 is attached to one side of the pivot arm 24. The latch plate 118 includes an upper tapered surface and a flat bottom surface. A brake release lever 120 includes a shaft 122 that includes a first end 122a which passes through a hole provided in one side of the brake lever 110. A shaft nut 123 secures the shaft to the brake lever 110. The shaft 122 is adapted to rotate and tilt slightly within the hole provided.

The shaft 122 includes an opposite end 122b that passes through a slot 124 provided in an opposite side of the brake lever 110. An end rod 126 is attached to the opposite end 122b of the shaft 122. The end rod 126 retains the opposite end 122b of the shaft 122 in the slot 124.

One end of the return spring 106 is attached to one end of the end rod 126. The return spring 106 tends to urge the opposite end 122b of the shaft 122 of the brake release lever 120 to the left of the slot 124, as shown (i.e., toward the pivot arm 24). The return spring 106 also urges the brake release lever 120 toward the first position. In the first position, the shaft 122 is disposed adjacent to the left side of the slot 124 and above the latch plate 118.

As is described in greater detail hereinafter, the opposite end 122b of the shaft 122 is adapted to extend over the upper tapered surface of the latch plate 118 as it is lowered. Once the shaft 122 is below the flat bottom surface of the latch plate 118, the return spring 106 urges the opposite end 122b under the flat bottom surface, thereby retaining the shaft 122 and brake lever 110 in a second position in which a braking force is applied.

FIG. 3b shows the brake assembly 100 as a braking force is being applied. The brake lever 110 has been urged downward sufficiently so that a bottom edge of the brake pad 102 is beginning to contact the surface 104. The brake pad 102 is a replaceable wear item that is chosen for the specific application to provide an optimum coefficient of friction intermediate the brake pad 102 and the surface 104.

The opposite end 122b is extended away from the pivot arm 24 by the latch plate 118. Careful examination reveals that in FIG. 3b, the opposite end 122b of the shaft 122 is on the verge of being urged downward sufficient to clear the flat bottom surface of the latch plate 118. The return spring 106 is fully extended.

FIG. 3c shows the brake assembly 100 in the second fully engaged position. The brake lever 110 has been lowered by the user sufficient so that the shaft 122 has cleared the bottom of the latch plate 118. The return spring has urged the opposite end 122b of the shaft 122 to the left of the slot 124 and under the flat bottom surface of the latch plate 118 where the latch plate 118 now retains the brake lever 110 in the second position.

In this position, the brake pad 102 is lowered an amount sufficient to cause the lower surface of the brake pad 102 to be disposed below the surface 104. This preferably compresses the spring 116 and brake pad 102, or it may alternatively attempt to raise the object, or both. It is generally not preferred that the object be raised a greater amount above the surface 104 when the brake assembly 100 is engaged. A positive frictional engagement intermediate the pivot arm 24 of the caster 10 and the surface 104 by the brake pad 102 is what is desired and attained.

This eliminates the possibility of movement occurring intermediate the wheels 14–18 and the surface 104, a problem with prior types of caster brakes which can cause unwanted movement of the object being supported by the caster 10. It does not matter if the wheels 14–18 move or not, the object is stable and the caster 10 is applying a braking force directly to the surface 104.

Depending on the intended application of the caster 10, the amount of compression of the pad 102, the material chosen for the pad 102, and the stroke of the brake lever 110 (i.e., the downward and upward range of extension of the brake pad 102) are varied as desired. These and other factors are all design-specific variables. Accordingly, the brake assembly 100 is locked and engaged with the surface 104. It is latched in the second position and cannot be dislodged or released without further action, as described hereinafter.

It is also readily apparent to the user whether or not the brake assembly 100 is engaged. If the brake lever 110 is raised (i.e., if it is close to the flange plate 26), the brake is in the first position and no braking force is applied. If the brake lever 110 is displaced away from the flange plate 26, it is in the second position and maximum braking force is applied. A second stop pin 128 prevents over rotation of the brake pad support member 112.

The spring 116 is maximally compressed in the second position. This allows a constant force to be applied to the brake pad 102. The spring 116 also compensates for irregularities in the surface 104 and also for wear of the brake pad 102 over time.

FIG. 3d shows the brake assembly 100 being released from the second latched position. As shown, it is ready to automatically retract, under force supplied by the return spring 106, back into the first position.

To release the brake assembly 100, the brake release lever 120 is urged downward. As the brake release lever 120 is urged downward, the end rod 126 rotates. As the end rod 126 rotates, a bottom portion thereof contacts and bears against a brake release pin 130 that is attached to the brake lever 110.

As additional force is applied to the brake release lever 120 in a downward direction, the end rod 126 continues to bear against the brake release pin an amount sufficient to urge the opposite end 122b of the shaft 122 away from the pivot arm 24 until the opposite end 122b clears the latch plate 118, as shown in FIG. 3d.

The brake lever 110 is now free to return to the first position. Normally, the user allows the brake lever 110 to return quickly with a snap. An audible snap is heard on engagement and also on release. The spring 116 also supplies a force that, on release, helps urge the brake lever 110 to return to the first position.

If for some reason (i.e., an especially sensitive load being supported) and the user preferred, he or she could also gently allow the brake lever 110 to return to the first position rather than releasing all contact and allowing return spring 106 to urge it back abruptly.

Referring back to FIG. 4 momentarily, a roller sleeve 131 is disposed over the shaft 122 and is free to rotate about the shaft. The roller sleeve 131 is in contact with the latch plate 118 and because it rotates, it allows for easier and smoother operation.

Several important advantages are provided by the brake assembly 100. First, the location of brake is always the same when viewed from above. This allows the user to quickly access and apply the brake whereas with prior art caster brakes that are disposed on the wheels, their position varies and accordingly, they can not be quickly accessed as the wheels wobble or change directions.

Second, the brake can be applied safely and easily even while in transit. With prior art caster brakes, there is danger that the user can actually place his foot under the wheels where it can be run over or severely pinched. While not generally preferred, in an emergency or in anticipation of a needed stop, the brake assembly 100 can be quickly, safely, and predictably applied while in motion.

Third, the brake assembly 100 has two positions. The first position is no brake force whatsoever is applied. The second position is full, normal brake force is applied. The brake is either set (applied) or it is not. This produces predictable results. Prior caster brakes produce uncertain variable results where the braking force can vary widely. Worse yet, this variance can occur without any tactile or visual feedback occurring.

Prior caster brakes also are not securely latched and therefore are prone to sudden unpredictable release with possible damage to the object or even impact to people and other objects occurring.

Fourth, the report (noise) that occurs on setting (when the latch bar 122 snaps into place) and release provides a clear indication of the braking status to the user. When the brake is set, the user feels this engagement, typically through his shoe and into his foot. It is similarly felt on release. Either position can be verified visually as well, thereby providing confirmation of position via three senses, hearing, feeling, and sight.

Figure 5:
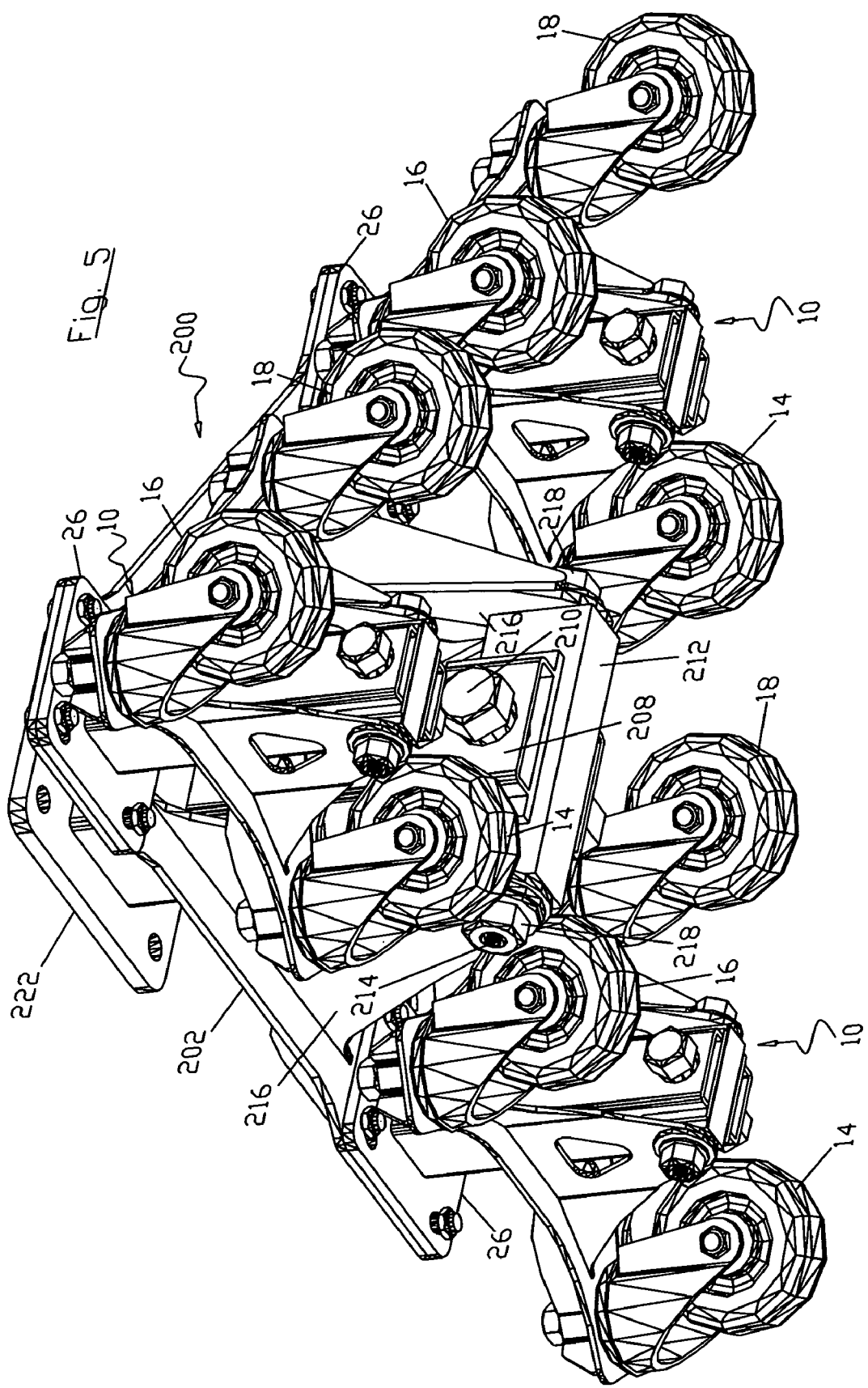
FIG. 5 is a view in perspective of the bottom of a modified articulated caster.
Figure 6:
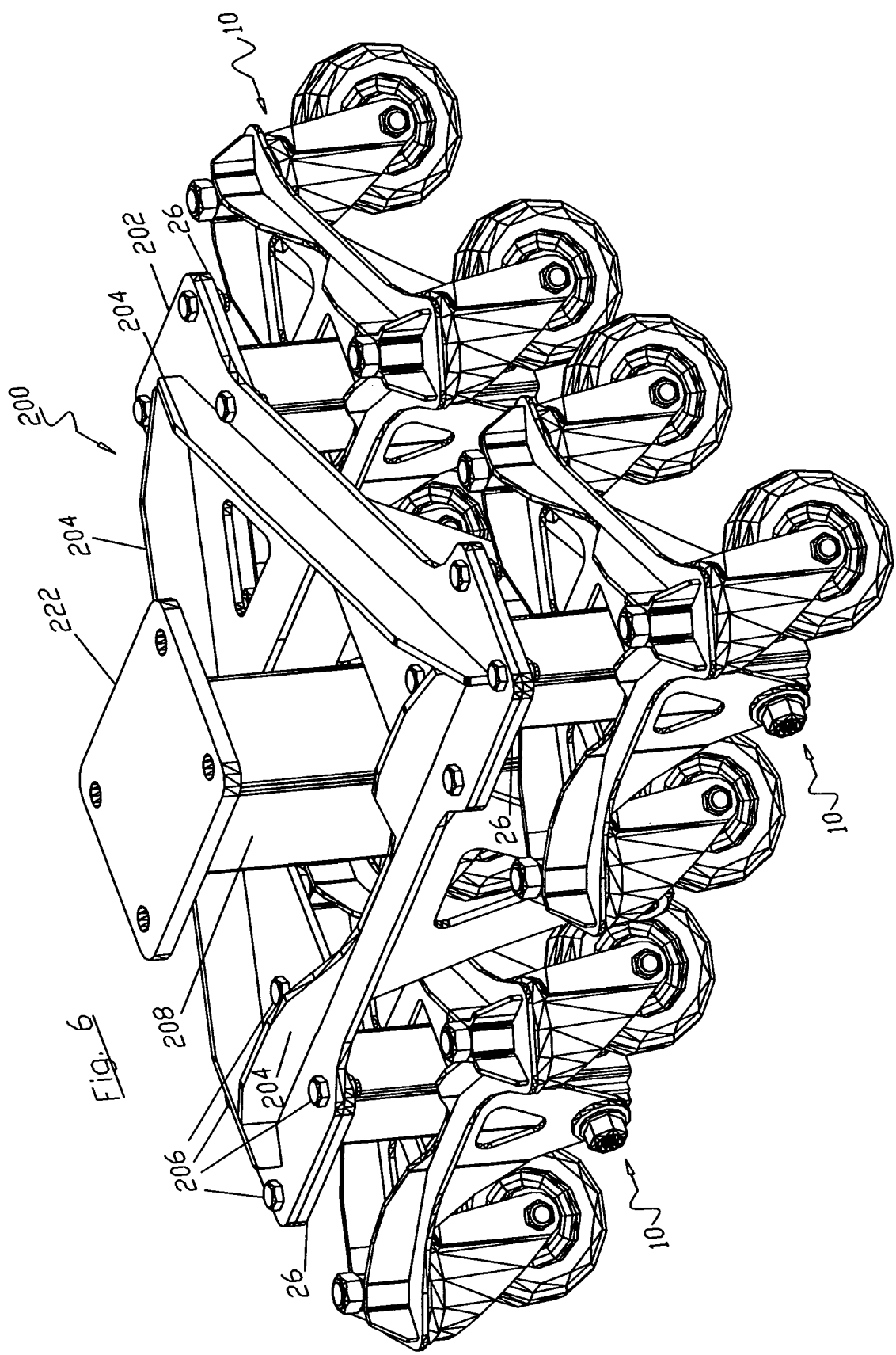
FIG. 6 is a view in perspective of the top of the modified articulated caster of FIG. 5.

Referring now to FIG. 5 and FIG. 6, is shown a modified articulated caster, identified in general by the reference numeral 200.

While the articulated caster 10, can of course be scaled to any desired size to accommodate a need for greater (or lesser) payload (i.e., carrying capacity), there is a potential disadvantage that can arise when substantially heavier payloads are encountered and a mere increase in the size of the articulated caster 10 is employed. That potential disadvantage is for the flange plate 26 to be elevated substantially higher as a result of an increased wheel 16 diameter size.

The modified articulated caster 200 solves this potential disadvantage by arranging three (or any number) of the articulated casters 10 together and attaching the flange plates 26 of each to an adapter plate 202.

The adapter plate 202 includes gusset plates 204 that are added to reinforce it, as necessary. Each of the flange plates 26 is secured to the adapter plate 202 by a plurality of bolts 206.

An enlarged pivot arm 208 is similar to the pivot arm 24 of the articulated caster 10. An enlarged first bolt 210 is used to secure the enlarged pivot arm 208 to an enlarged pivot block 212.

The enlarged pivot arm 208 is adapted to pivot about a center longitudinal axis of the enlarged first bolt 210 with respect to the enlarged pivot block 212.

A pair of enlarged threaded extensions 214 that extend from opposite sides of the enlarged pivot block 212 each pass through one of a pair of enlarged side members 216. A pair of enlarged lock nuts 218 secure each end of the enlarged pivot block 212 to one of the enlarged side members 216.

The enlarged pivot block 212 is adapted to pivot about a center longitudinal axis thereof with respect to the enlarged side members 216.

Together, the enlarged pivot block 212 and the enlarged first bolt 210 provide two-axis pivoting (i.e., a universal joint) for the enlarged pivot arm 208 with respect to the adapter plate 202 within a space provided by an enlarged opening 220 in the adapter plate 202.

An enlarged flange plate 222 is attached to an upper end of the enlarged pivot arm 208 and is used to attach the modified articulated caster 200 to either a platform or directly to a heavy object (not shown) with a substantial increase in carrying capacity and only a slight increase in height above grade of the enlarged flange plate 222 as compared to that of the flange plate 26.

Another benefit provided by the modified articulated caster 200 is an ability for all castor wheels 14, 16, 18 to individually adapt to small changes in the grade without substantially affecting the plane of the adapter plate 202 or the heavy object. In other words, the heavy object is not raised or lowered with respect to grade as the individual caster wheels 14–18 pass over small changes or fluctuations in the surface upon which they bear.

This makes is easier to move the heavy object because horizontal movement is free of vertical movement. It also provides a smoother ride for the heavy object, which does not rise and fall in response to the small fluctuations experienced by the wheels 14–18. This smoother ride helps prevent damage to the heavy object, much the same as the articulated caster 10 provides a smoother, safer ride for the object that it supports during transport.

Another benefit provided by the modified articulated caster 200 is that substantial changes in grade, for example changes in the slope of the grade that are encountered, are compensated for by movement (i.e., a rising and falling) of the individual wheels 14–18 as well as by the various articulated casters 10.

As the articulated casters 10 respond to changes in grade or when they must rise over more substantial objects (not shown), these changes are transferred to the adapter plate 202, which pitches in response to these variations. However, the heavy object remains substantially unaffected, disposed on the same plane above grade, due to the universal joint action provided by the mounting of the enlarged pivot arm 208 with respect to the adapter plate 202.

The combined ability of the individual articulated casters 10 to adapt to changes in grade by the wheels 14–18, and of the adapter plate 202 to adapt to more substantial changes in grade provides a method of supporting an object (or heavy object) that allows for optimum ease of transport, maintains the object at nearly a predetermined elevation above grade, keeps that elevation as low as possible even when a substantial carrying capacity is required, and isolates the payload (i.e., the object or heavy object) from fluctuations that occur on the surface. Rolling resistance is actually decreases. It becomes easier to change direction as well. Greater and more uniform floatation over the surface is attained as well.

Of course, any number of the articulated casters 10 can be used with a modified adapter plate (not shown). It is also possible to duplicate the overall process described above for even larger payloads or whenever greater floatation, less rolling resistance, or easier direction change is desired. For example, the enlarged flange plate 222 of the modified articulated caster 200 can be attached to a modified enlarged adapter plate (not shown) in which a plurality of the modified articulated casters 200, each of which having a plurality of articulated casters 10, can be used.

It is noted that typically, as more and more casters 10 are used, their size is scaled down accordingly. This provides the desired benefits with lower structures that better distribute the load and compensate for surface irregularities. Smaller wheels 14, 16, 18 can be used with multiple groupings of the casters 10 and still climb over substantial obstacles because of the articulation and floatation characteristics obtained.

A preferred method of distributing the load over a number of different carriages (i.e., the articulated casters 10) through the universal (or cross-axis) type of joints is herein disclosed. It is also possible to mount any of the joints (for the articulated caster 10 or the modified articulated caster 200) in a manner that provides pivotal motion about only one axis, instead of about two axes simultaneously, as the preferred embodiments herein disclose.

The modified articulated caster 200 can, of course, also be used with the brake assembly 100, as disclosed for with the articulate caster 10, as desired. If desired, a modified enlarged brake assembly (not shown) can be attached to the enlarged pivot arm 208.

Figure 7:
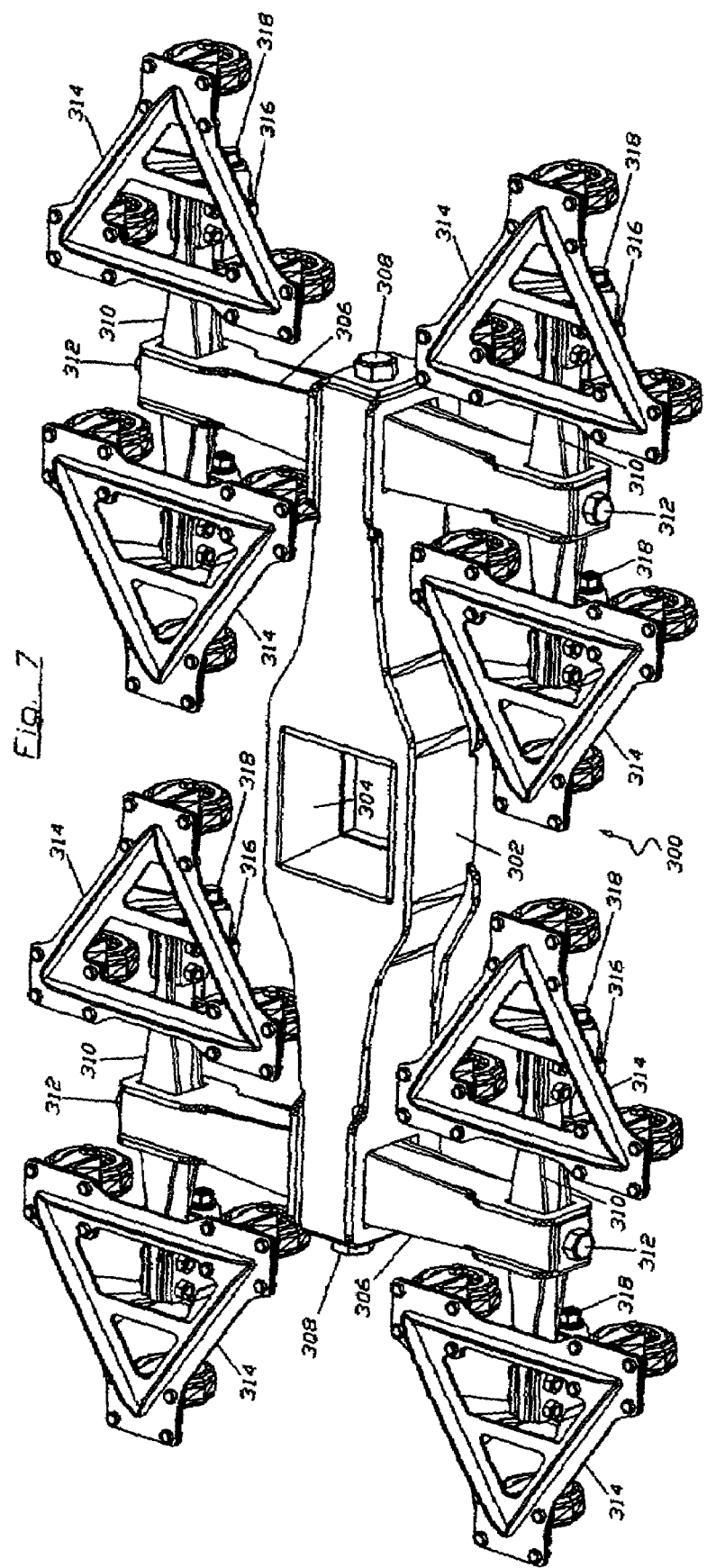
FIG. 7 is a view in perspective of the top of a second modified articulated caster.

Referring now to FIG. 7 is shown a second modified articulating caster, identified in general by the reference numeral 300.

The second modified articulated caster 300 includes a central beam 302 to which a payload object (not shown) is attached to a center recess 304 thereof.

A pair of transverse beams 306 are attached to opposite ends of the central beam 302 by an end bolt 308 (only one shown) that are located at each end of the central beam 302.

Each of the transverse beams 306 is adapted to pivot around the axis of the end bolts 308 a limited amount.

Attached to each end of each transverse beam 306 is a second transverse beam 310. Each second transverse beam 310 is adapted to pivot around a second end bolt 312 that secures the second transverse beam 310 to each end of the transverse beam 306.

Accordingly, pivoting about two axes is provided, the first axis being with respect to a center longitudinal axis of the end bolt 308 and the second being with respect to a center longitudinal axis of the second end bolt 312, the two axes being perpendicular with respect to each other.

The end of each of the second transverse beams 310 is pivotally attached to a caster assembly 314 by a caster pivot bolt 316. The caster pivot bolt 316 provides an axis that is parallel to that of the second end bolt 312 and it allows the caster assembly 314 to articulate about the caster pivot bolt 316.

This allows the smaller caster assemblies 314 to articulate about this axis to accommodate smaller fluctuations in the surface while the second end bolt 312 allows the second transverse beams 310 to pivot about a parallel axis to accommodate larger variations in the grade of the surface without substantially affecting the position of the central beam 302. Usually, the smaller caster assemblies 314 are able to adapt and accommodate the greater part of any variations in the grade of the surface.

A lower caster pivot bolt 318 includes a longitudinal axis that is parallel to that of the end bolts 308 and allows the caster assemblies 314 to pivot about this axis to accommodate smaller grade fluctuations while the transverse beams 306 similarly pivot about the end bolts 308 to accommodate larger grade fluctuations.

It is important to note that the second transverse beam 310 extends out of the side of the caster assembly 314. This provides substantial benefits where low structure height is attained. This general concept is discussed in greater detail hereinafter (see discussion appertaining to FIG. 9).

Figure 8:
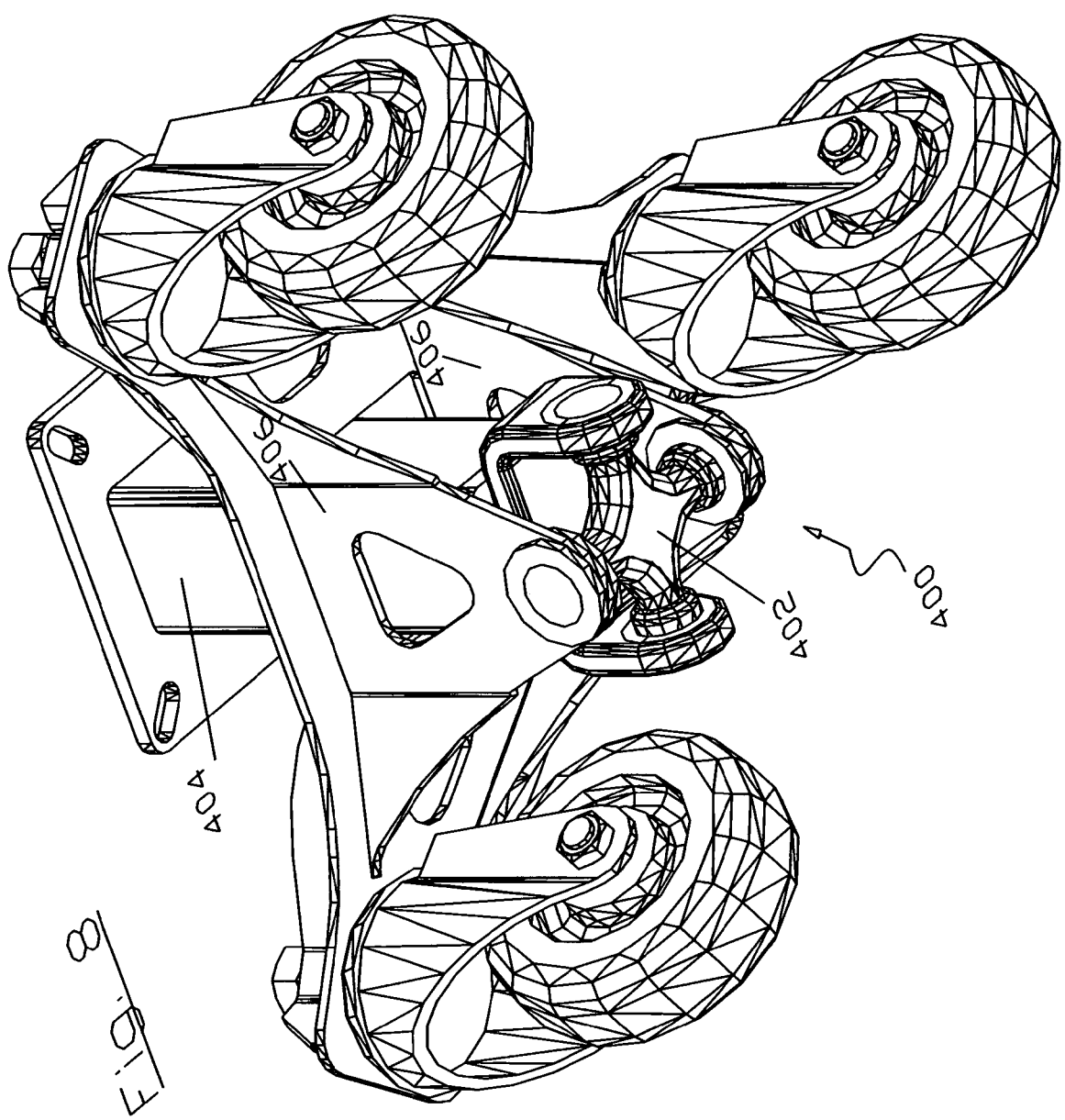
FIG. 8 is a view in perspective of the bottom of a third modified articulated caster.

Referring now to FIG. 8 is shown a third modified caster 400 that includes a conventional type of a universal joint 402 attached to a modified pivot arm 404 and to a pair of second modified side members 406.

The second modified side members 406 are each adapted to retain a bearing race into which the end of the universal joint 402 is secured.

The modified pivot arm 404 is adapted to retain a pair of bearing races into which the two remaining ends of the universal joint 402 are secured.

Accordingly, the modified pivot arm 404 is adapted also to pivot about two axes that are perpendicular with respect to each other, each one of the two axes passing through an opposite end of the universal joint 402.

While the universal joint 402 may be used to provide the desired articulation for the third modified caster 400, it may be more difficult to assemble, maintain, or replace that the previously disclosed embodiments and it is reserved for those applications where it use is preferred.

Figure 9:
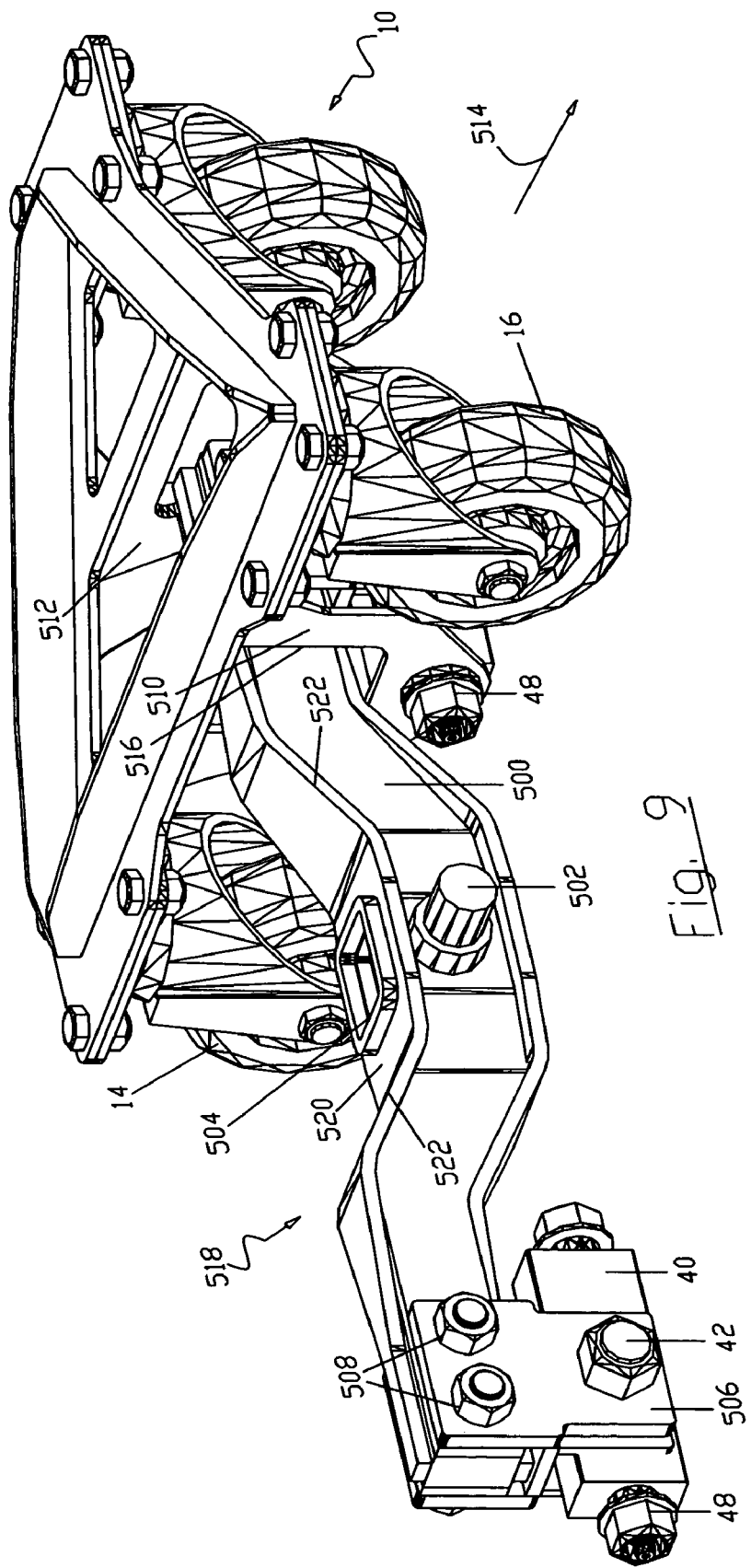
FIG. 9 is a view in perspective of a horizontal pivot arm attached to an articulated caster.

Referring now to FIG. 9 is shown a horizontal pivot arm 500. The horizontal pivot arm 500 does not extend upward from the caster 10 but rather extends out from the side while still maintaining the full range of articulation as previously described. A very low profile is also achieved because the horizontal pivot arm 500 does not extend upward. Other substantial benefits are also attained by use of the horizontal pivot arm 500 and are described hereinafter.

Each end of the horizontal pivot arm 500 is attached to one of the casters 10. Only the right caster 10 is shown in the drawing figure. The left caster is not shown to better illustrate how the horizontal pivot arm 500 is attached to each of the casters 10 so as to maintain articulation about the two axes.

The horizontal pivot arm 500 is secured to a pair of raised side members 506 by a pair of bolts 508. Each of the raised side members 506 are, in turn, pivotally attached to the pivot block 40 by the first bolt 42. The threaded extensions of the pivot block 40 are secured by the pair of lock nuts 48 and pivotally secure the pivot block 40 to a second modified side member 510 and to an opposite side member 512.

The second modified side member 510 is disposed between two of the caster 10 wheels 14, 16. A preferred direction of movement by the caster 10 is shown by arrow 514. The second modified side member 510 includes a plane that generally aligns with the arrow 514.

An enlarged side member opening 516 is provided in the second modified side member 510 through which the horizontal pivot arm 500 extends. The enlarged side member opening 516 provides clearance for the horizontal pivot arm 500 to move relative to the second modified side member 510 as the caster 10 changes attitude during transit in response to irregularities of the floor surface beneath the caster 10.

The opposite side member 512 does not require the enlarged side member opening 516 because the horizontal pivot arm 500 does not pass through it, although the enlarged side member opening 516 can be included in the opposite side member 512, if desired.

The horizontal pivot arm 500 includes a lower portion in the middle identified in general by the reference numeral 518. The lower portion 518 includes a flat bottom member 520 connected to two angled sides 522.

A circular bearing shaft 502 is attached to an outside of the lower portion 518, below the flat bottom member 520. A center load point 504 opening is provided proximate the bearing shaft 502. The circular bearing shaft 502 is useful for connecting a plurality of the horizontal pivot arms 500 together, for multiple ganging of the casters 10, and it use is described in greater detail hereinafter.

The lower portion 518 keeps the geometry low, which allows for a lowered elevation of any object, which is preferred. The horizontal pivot arm 500 allows for connection together of a pair of casters 10 (only the one is shown) to divide and support the weight of the load between them. Accordingly, each caster 10 supports only about one-half the load while still fully adapted to articulate about the two axes with respect to the horizontal pivot arm 500.

Figure 10:
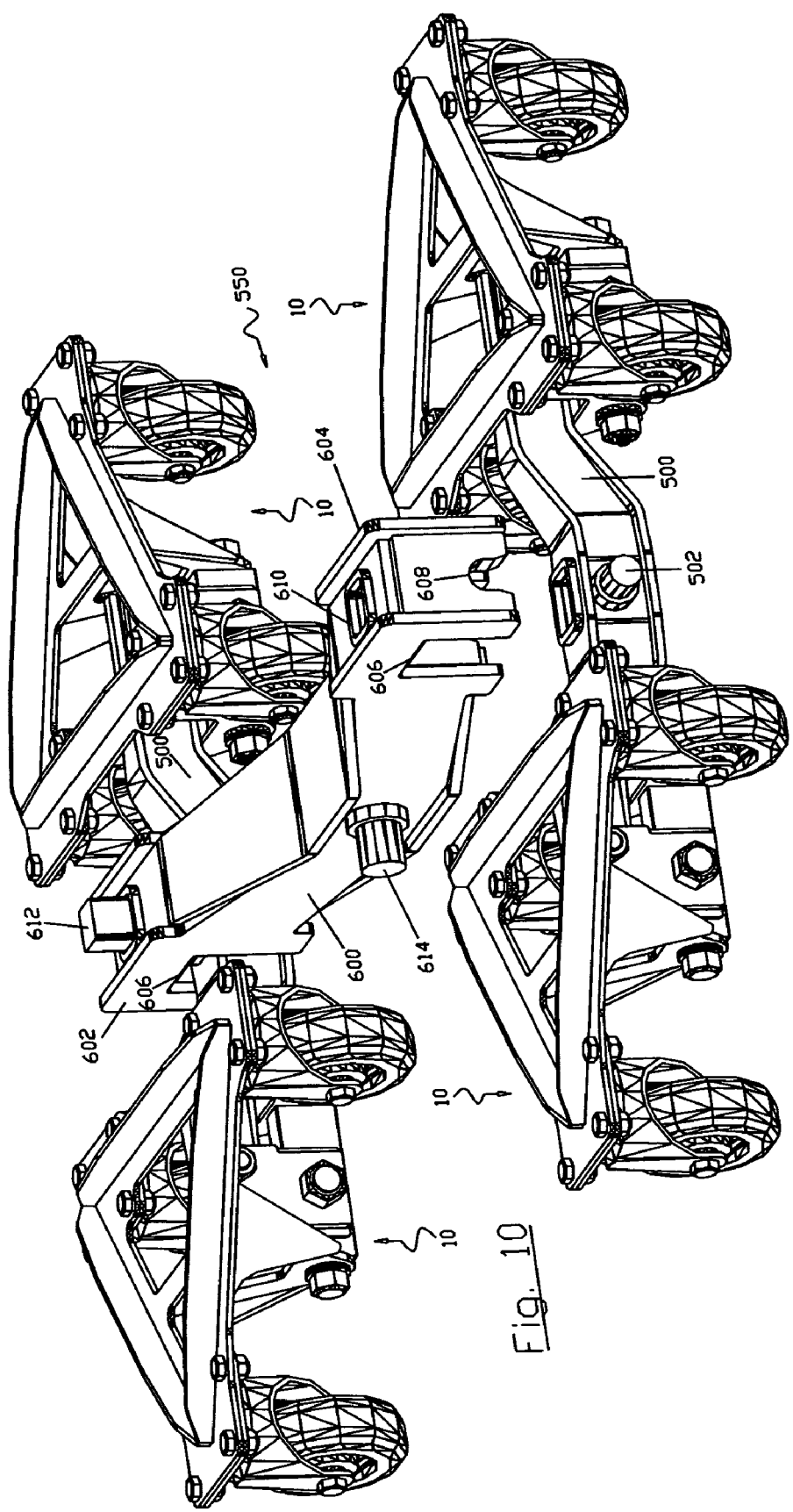
FIG. 10 is a view in perspective of an interlocking system for ganging pairs of articulated casters together to make groups of four or more.

Referring now to FIG. 10 is shown an interlocking system, identified in general by the reference numeral 550. Four casters 10 are each connected together in pairs by one of the horizontal pivot arms 500.

The two pairs of interconnected casters 10 are then disposed in a parallel spaced-apart orientation. An intermediate member 600 is used to connect the two pairs of casters 10 together and it includes a lowered center portion and a pair of opposite ends 602, 604.

The opposite ends 602, 604 include side cutouts 606 that allow each end of the intermediate member 600 to be placed atop a center of the lower portion 518 of a respective one of the horizontal pivot arms 500. An arcuate cutout 608 is provided at each of the opposite ends 602, 604.

The arcuate cutout 608 rests on top of the bearing shaft 502 thereby allowing for side to side articulation of the intermediate member 600 along a center longitudinal axis of the bearing shaft 502 and with respect to each of the horizontal pivot arms 500. A center load point connection 610 allows passage of a load member 612 to the horizontal pivot arm 500 or, if preferred, the connection can occur within the opposite ends 602, 604, as desired. The load member 612 conveys the weight of the load to the device.

The intermediate member 600 is simply placed atop the two horizontal pivot arms 500. The arcuate cutout 608 and the side cutouts 606 secure the two horizontal pivot arms 500 to the intermediate member 600. In use, any applied load only tends to further urge the intermediate member 600 down thereby further securing it to the two horizontal pivot arms 500. This allows for rapid "ganging" (i.e., joining) together of pairs of the casters 10.

A second bearing shaft 614 attached to the intermediate member 600 allows another intermediate member (not shown) to be placed over two of the intermediate members 600 thereby connecting eight casters 10 together. This further distributes the weight of the load while allowing each individual caster 10 to articulate over surface irregularities.

This results in the capacity to transport up to heavy loads that are not elevated above the surface a significant amount and to do so with especially low rolling resistance. Also, being able to utilize a great many wheels 14, 16, 18 to support a load (whenever two or more of the casters 10 are used) allows for a wide selection in the type of material used to form the wheels (the portion that contacts the surface). Softer materials can be used as well as hard materials.

A wide range of design flexibility is thereby attainable. Materials, for example, that can withstand insertion into an environmental chamber and which can experience a wide temperature variation, but which have a limited load carrying ability can now be used to form the wheels 14, 16, 18 when multiple groups of the casters 10 are ganged together. Other more economical materials can similarly be used. Materials that provide increased friction, low rolling noise, etc. can instead be used to form the wheels 14, 16, 18 that previously, when a single type of a conventional caster (not shown) was used, were not viable design choices.

Figure 11:
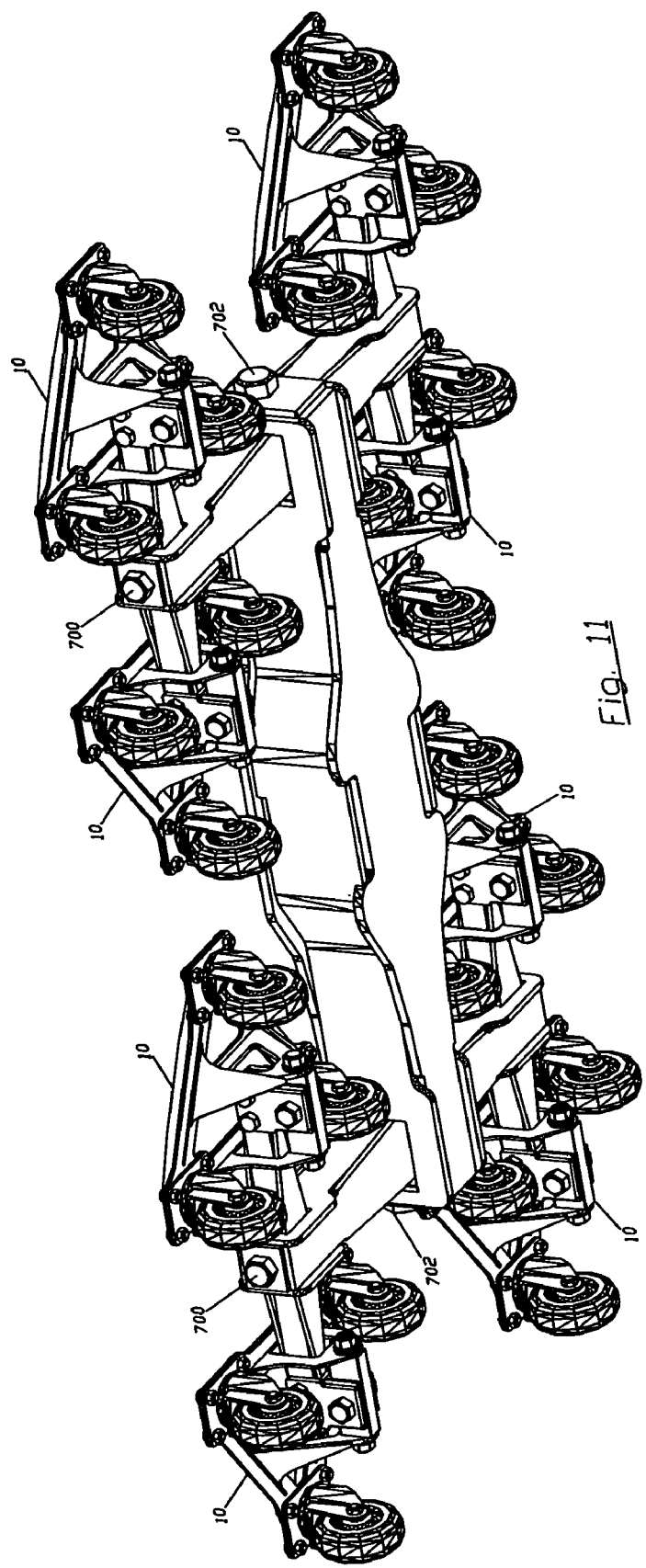
FIG. 11 is a view in perspective of the bottom of an alternative interlocking system for ganging pairs of articulated casters together.

Referring now to FIG. 11 is shown another method for ganging multiple pairings of the casters 10 together. The method shown includes pivot bolts 700, 702 that pivotally secure the assemblies together, which pass through openings that are provided. For certain applications, this is preferred. The example shown includes eight casters 10, although any number of casters 10 can be connected together, as desired, in any of a variety of possible ways.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

For example, the caster 10 can include a newly designed type of a braking system or an older conventional type of caster brake that applies force directly to any of the wheels 14, 16, 18, if preferred. It is also possible to provide braking by forcing two of the wheels into non-parallel positions with respect to each other.

What is claimed is:

1. An articulated caster, comprising:
   (a) a base assembly including a base and at least three caster wheels attached to said base, with the base assembly presenting a substantially flat base surface;
   (b) a pivot arm presenting a substantially flat arm surface; and
   (c) a pivot block that pivotally interconnects the base assembly and the pivot arm to permit relative pivotal movement therebetween about two axes, said pivot block including first and second substantially flat surfaces, with the first surface slidably engaging the base surface of the base assembly to restrict movement about a first one of the axes and the second surface slidably engaging the arm surface of the pivot arm to restrict movement about a second one of the axes.

2. The articulate caster of claim 1 wherein said pivot arm is adapted to extend upwardly from said base assembly.

3. The articulate caster of claim 1 wherein said pivot arm is adapted to extend laterally away from said base assembly.

4. The articulate caster of claim 1 wherein said pivot arm is adapted to extend laterally through an enlarged side opening provided in said base assembly.

5. The articulated caster of claim 1;
an adapter member;
a second base assembly spaced from the first-mentioned base assembly;
a second pivot arm spaced from the first-mentioned pivot arm and pivotally interconnected with the second base assembly,
said adapter member interconnecting the pivot arms.

6. The articulated caster of claim 5 wherein one of said pivot arms extends sideways through an opening provided in the corresponding base assembly.

7. The articulated caster of claim 1 wherein said pivot arm includes an upper end and an opposite lower end and wherein said opposite lower end is adapted to pivot about the two axes.

8. The articulated caster of claim 7 wherein said two axes are substantially perpendicular.

9. The articulated caster of claim 8 and wherein said two axes are disposed in said pivot block.

10. The articulated caster of claim 7 wherein said base includes two side members that are disposed on opposite sides of an opening provided in said base said lower end of said pivot arm being disposed in said opening and wherein said universal joint includes a bolt that passes through opposite sides of said two side members and wherein said pivot one of said pivot axes extends longitudinally through said bolt.

11. The articulated caster of claim 1,
said base assembly presenting a pair of the base surfaces,
said pivot block presenting a pair of the first surfaces, each of which slidably engages a corresponding one of the base surfaces.

12. The articulated caster of claim 11,
said base surfaces being in an opposed relationship and facing inwardly toward one another.

13. The articulated caster of claim 12,
said base including a pair of side members between which the pivot block is located,
said side members each defining a respective one of the base surfaces.

14. The articulated caster of claim 1,
said pivot arm presenting a pair of the arm surfaces,
said pivot block presenting a pair of the second surfaces, each of which slidably engages a corresponding one of the arm surfaces.

15. The articulated caster of claim 14,
said arm surfaces being in an opposed relationship and facing inwardly toward one another.

16. The articulated caster of claim 15,
said pivot arm including a pair of side plates between which the pivot block is located,
said side plates each defining a respective one of the arm surfaces.

17. The articulated caster of claim 1,
said arm surface and said base surface being perpendicular relative to one another.

18. The articulated caster of claim 17,
said first one of the axes intersecting the base surface,
said second one of the axes intersecting the arm surface.

* * * * *